(12) United States Patent
Kamath et al.

(10) Patent No.: US 10,178,011 B2
(45) Date of Patent: Jan. 8, 2019

(54) NETWORK TRAFFIC MANAGEMENT VIA NETWORK SWITCH QOS PARAMETERS ANALYSIS

(71) Applicant: Hewlett Packard Enterprise Development LP, Houston, TX (US)

(72) Inventors: Harish B. Kamath, Bangalore (IN); Michael Lee Witkowski, Tomball, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/429,373

(22) Filed: Feb. 10, 2017

(65) Prior Publication Data

US 2017/0230269 A1    Aug. 10, 2017

(30) Foreign Application Priority Data

Feb. 10, 2016    (IN) .............................. 201641004746

(51) Int. Cl.
| | |
|---|---|
| *H04L 12/26* | (2006.01) |
| *H04L 12/873* | (2013.01) |
| *H04L 12/863* | (2013.01) |
| *H04L 12/931* | (2013.01) |
| *H04L 12/24* | (2006.01) |
| *H04L 12/935* | (2013.01) |

(52) U.S. Cl.
CPC ...... *H04L 43/0894* (2013.01); *H04L 41/0816* (2013.01); *H04L 41/0823* (2013.01); *H04L 47/522* (2013.01); *H04L 47/6215* (2013.01); *H04L 49/205* (2013.01); *H04L 49/3018* (2013.01)

(58) Field of Classification Search
CPC .. H04L 43/08–43/0894; H04L 41/0803; H04L 41/0813–41/082; H04L 41/0823–41/0836; H04L 41/0896; H04L 47/24
See application file for complete search history.

(56) References Cited

U.S. PATENT DOCUMENTS

| | | |
|---|---|---|
| 5,432,790 A | 7/1995 | Hluchyj |
| 6,278,693 B1 | 8/2001 | Aldred |
| 6,665,264 B1 | 12/2003 | Davison |
| 6,678,248 B1 | 1/2004 | Haddock |

OTHER PUBLICATIONS

Khalil Shihab, Modeling and Performance Evaluation of ATM Switches, Sep. 15-17, 2005, 7 Pgs., <http://www.wseas.us/e-library/conferences/2005malta/papers/499-200.pdf.

*Primary Examiner* — Eric Myers

(74) *Attorney, Agent, or Firm* — Brooks, Cameron & Huebsch, PLLC (57) ABSTRACT

Some examples disclosed herein relate to traffic management via network switch QoS parameters analysis. In one example, a set of actual QoS parameters maybe analyzed using a set of configured QoS parameters of each network switch. A set of modified QoS parameters for each network switch maybe determined based on the analysis of the set of actual QoS parameters. The set of modified QoS parameters maybe recommended to configure each network switch for improved traffic management.

11 Claims, 9 Drawing Sheets

FIG. 1B

| QUEUE | ASSIGNED BANDWIDTH | AVERAGE DEMANDED BANDWIDTH | UNUTILIZED BANDWIDTH | RECOMMENDED BANDWIDTH | QUEUE BANDWIDTH >4% | QUEUE SPLIT RECOMMENDATION |
|---|---|---|---|---|---|---|
| Q1 | 41 | 38 | 3 | 38 | YES | TRUE |
| Q2 | 31 | 56 | -25 | 40 | YES | TRUE |
| Q3 | 18 | 22 | -4 | 20 | YES | TRUE |
| Q4 | 10 | 2 | 8 | 2 | NO | FALSE |
| TOTAL ASSIGNED BANDWIDTH | 100 | | | 100 | | |
| TOTAL UNUTILIZED BANDWIDTH | 11 | | | | | |
| TOTAL BANDWIDTH REQUIRED | -29 | | | | | |

| RECOMMENDED QUEUE BANDWIDTH | RECOMMENDED QUEUES | SHAPING | DROP COUNT | SCHEDULING PROPERTY | QUEUE PRIORITY |
|---|---|---|---|---|---|
| 15 | Q11 | NOT APPLIED | IGNORED | CARRY FORWARD | 12 |
| 23 | Q12 | | | CARRY FORWARD | 11 |
| 17 | Q21 | RATIO CARRY FORWARDED PER SPLIT QUEUE | PRIORITIZE | CARRY FORWARD | 10 |
| 16 | Q22 | | IGNORE | CARRY FORWARD | 9 |
| 6 | Q23 | | | RECOMMEND NEW POLICY BASED ToS TYPE | 8 |
| 9 | Q31 | NOT APPLIED | IGNORED | RECOMMEND NEW POLICY BASED ToS TYPE | 7 |
| 11 | Q32 | | | CARRY FORWARD | 6 |
| 2 | Q4 | NOT APPLIED | IGNORED | CARRY FORWARD | 5 |

NETWORK TRAFFIC MANAGEMENT VIA NETWORK SWITCH QOS PARAMETERS ANALYSIS

BACKGROUND

Quality of Service (QoS) is a business level policy applied to individual network switches in a network in order to deliver optimized business outcomes in a datacenter. Network switch level policy definitions involve applying a series of parameter values that constitute a QoS configuration which influences traffic classification, congestion avoidance and/or congestion management of the network switch. The behavior exhibited by a network switch may depend on hardware capabilities, traffic types, traffic load traversing the network switch, and/or the QoS configuration that have been applied.

BRIEF DESCRIPTION OF THE DRAWINGS

Examples are described in the following detailed description and in reference to the drawings, in which.

DETAILED DESCRIPTION

Quality of Service (QoS) is a business level policy applied to at least one individual network switch in a network in order to deliver optimized business outcomes in a datacenter. Network switch level policy definitions involve applying a series of parameter values that constitute a QoS configuration which influences traffic classification, congestion avoidance and/or congestion management of the network switch. The behavior exhibited by the network switch depends on the hardware capabilities, traffic types and traffic load traversing the network switch, and the QoS configurations that have been applied. Further, QoS policies may be assigned based on accepted best practices, in a relatively static manner. Furthermore, as described above, applying QoS configurations to the network switch in a static manner means that there may be no feedback mechanism to network managers or operators as to the efficiency of these applied policies to achieve the desired business policies and outcomes. Therefore, a more dynamic mechanism for detecting changes in the network environment (traffic or underlying network switch capabilities) and adjusting QoS configurations and policies to maintain optimized business outcomes may be desired.

For example, changing traffic loads or traffic types over the course of time may obsolete the QoS configurations that have been applied to at least one network switch in a network in the past. In other words, network switches delivering normal behavior may start to exhibit threshold limit conditions potentially due to changes in application traffic, changes in network topology (how the network switches are connected), and/or changes in the brand or type of network switches installed in the network. Such behavior may demonstrate network and application level issues requiring performance or capacity improvements, or changes in QoS configurations.

Further for example, some of the network switches in the network/datacenter may not have the same capabilities as they may be based on devices from different vendors or they are based on different generations of devices from the same vendor. Either a QoS policy may be applied to the lowest common denominator of network switch capability, or the policy may not be implemented as expected on network switches of lower capability. When ingress packets are received at a network switch port, they may be classified into a traffic type or class and possibly re-marked (packet QoS related fields modified). The network switch may then determine the egress port and queue to forward the packet, and may then enforce QoS policies, which may result in the packet being dropped, delayed, and/or scheduled for transmission (using traffic shaping configurable specified in the QoS policy). In addition, for example, for the same QoS properties, the packet processing may differ from network switch to network switch due to differences in the underlying hardware. Thus, QoS policies are expected to be universal, but they may be based on a lack of insight into network switch specific hardware capabilities and actual application traffic patterns.

Also, network management methods may decouple QoS control from network monitoring capabilities and leave it to IT administrators to detect network behavior and adjust QoS configurable parameters appropriately. Often this may happen very slowly, if at all. Detecting network behavior can be very complex and may be influenced by network switch capabilities, network switch configuration and/or workload information. Making sense of this data altogether (if available) and arriving at refined QoS parameter values for the network switch or for each port of the network switch may involve enormous effort and further may involve developing computational schemes by an IT administrator having good insights about the products in use and deployment details as well. Furthermore, applying this to the scale of large datacenter can be a mammoth task by itself.

To address these issues, the present specification describes a method to analyze the QoS parameter values, traffic conditions, and network switch hardware capabilities in order to recommend updated QoS configurable/values to avoid/manage congestion. In addition, the present specification provides remedial measures for packet drops, network switch congestion, or prioritizing traffic to have an optimized number of queues defined in a network switch, calibrated queue bandwidth, and/or grouping of traffic classes considering the RFC specified traffic priorities. Network processors or network monitoring agents may provide traffic statistical information which when processed may help to achieve the right QoS properties for a given network switch and thus deliver optimized business outcomes to a datacenter. Moreover, QoS parameter settings may be based on data defined by best practices and with the assumption of certain traffic types being present at specific data rates. The actual traffic patterns being handled by the network switches may not be factored into best practices used to set the QoS configurable settings. Further, to solve these issues, the present specification describes a more dynamic mechanism for detecting changes in the network environment (traffic or underlying network switch capabilities) and adjusting QoS configurations and policies manually/automatically to maintain optimized business outcomes while maintaining the "spirit" of the original best practice QoS parameter settings.

Also, port specific QoS properties for ingress traffic can be a challenge given the varied traffic patterns, traffic types, bandwidth, and the like. Further to address this issue, the present specification enables deriving and applying QoS resource properties based on the ingress traffic observed and analyzed at the various ports on the network switch. Furthermore, to address this issue, the present specification monitors flow of activities, such as traffic monitoring, traffic/queue/QoS parameter analysis, and/or application of updated queue and traffic classification QoS configurations.

In addition, incorrectly classified traffic in the network (due to inadequate QoS classification parameter settings), may cause or influence congestion. The present specification addresses such a situation by dynamically/manually provisioning additional queues (up to the max supported by the network switch device), moving at least one traffic classes to a new lower priority queue, and/or altering the bandwidth configuration of the newly provisioned queue. Also, the present specification may alleviate any undesirable act of promoting a traffic class which may have a tendency to destabilize traffic flow through the network switch.

As ingress traffic (packets) are received by the network switch, they are classified and placed onto preconfigured queues based on traffic class. To arrive at a fair allocation of bandwidth and help achieve an optimized classification of traffic, the present specification prescribes analyzing the incoming traffic to arrive at a series of QoS configuration changes that might include the possibility of adding more queues, changing the traffic classification policies in the QoS configurable to utilize the additional queues, and/or adjusting queue properties to proportionately share the bandwidth.

In the following description, for purposes of explanation, numerous specific details are set forth in order to provide a thorough understanding of the present techniques. It will be apparent, however, to one skilled in the art that the present apparatus, devices and systems may be practiced without these specific details. Reference in the specification to "an example" or similar language means that a particular feature, structure, or characteristic described is included in at least that one example, but not necessarily in other examples.

The terms "network" and "datacenter" are being used interchangeably throughout the document.

Figure 1A:
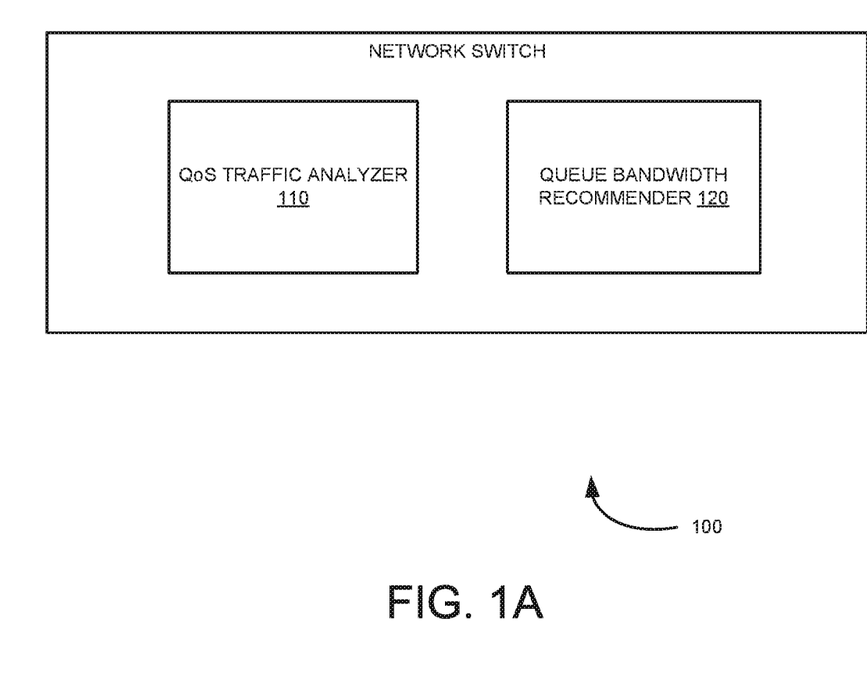
FIG. 1A illustrates a block diagram of an example network switch for traffic management in a datacenter using configurable QoS parameter analysis.
Figure 1B:
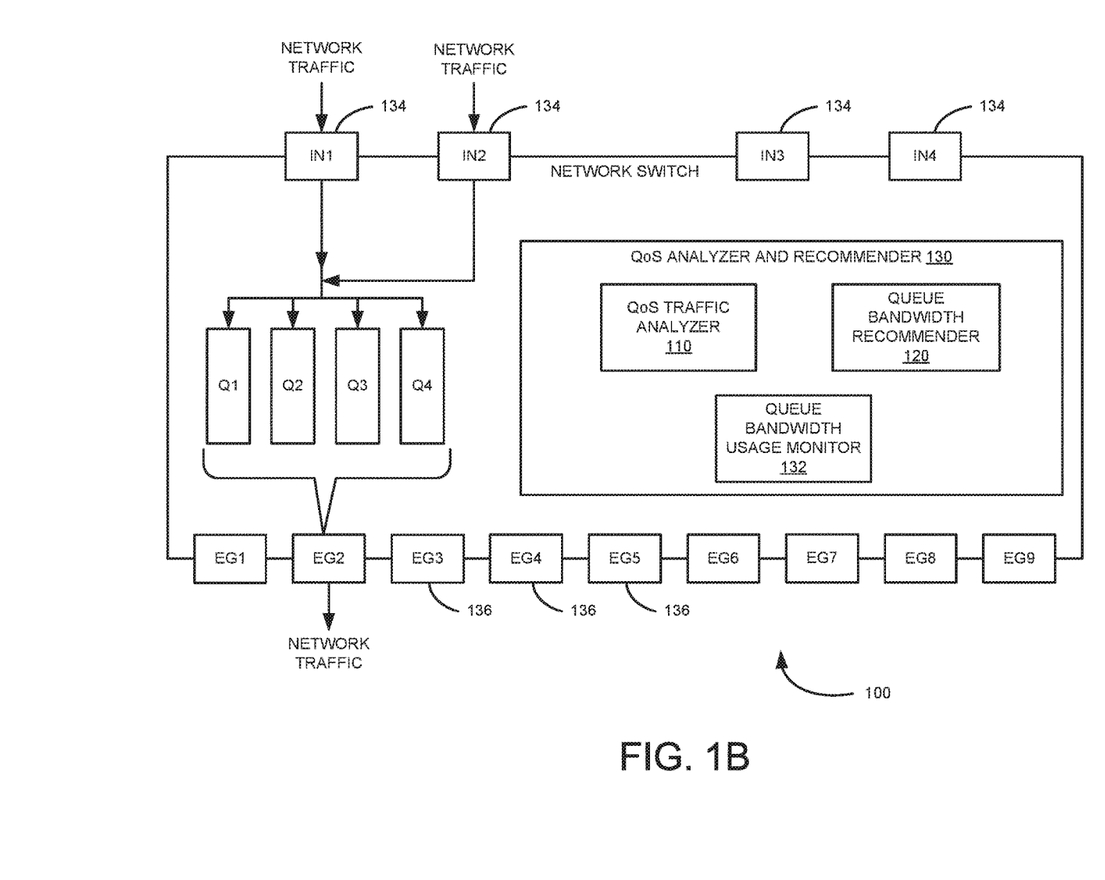
FIG. 1B illustrates another block diagram of an example network switch for traffic management in a datacenter using configurable QoS parameter analysis.

Turning now to the figures, FIG. 1A illustrates an example network switch 100 for network traffic management via configurable QoS parameters in a datacenter. The network switch 100 may include a QoS traffic analyzer 110 and a queue bandwidth recommender 120. FIG. 1B illustrates another example network switch 100 for network traffic management via configurable QoS parameters in a datacenter. The network switch 100 may include a QoS analyzer and recommender 130, multiple input ports IN1 to IN4 134, multiple output ports EG1 to EG9 136, and multiple queues Q1 to Q4 associated with input ports IN1 and IN2 and output port EG2. In an example shown in FIG. 1B, the QoS analyzer and recommender 130 may include the QoS traffic analyzer 110, the queue bandwidth recommender 120, and a queue bandwidth usage monitor 132.

Figure 3:
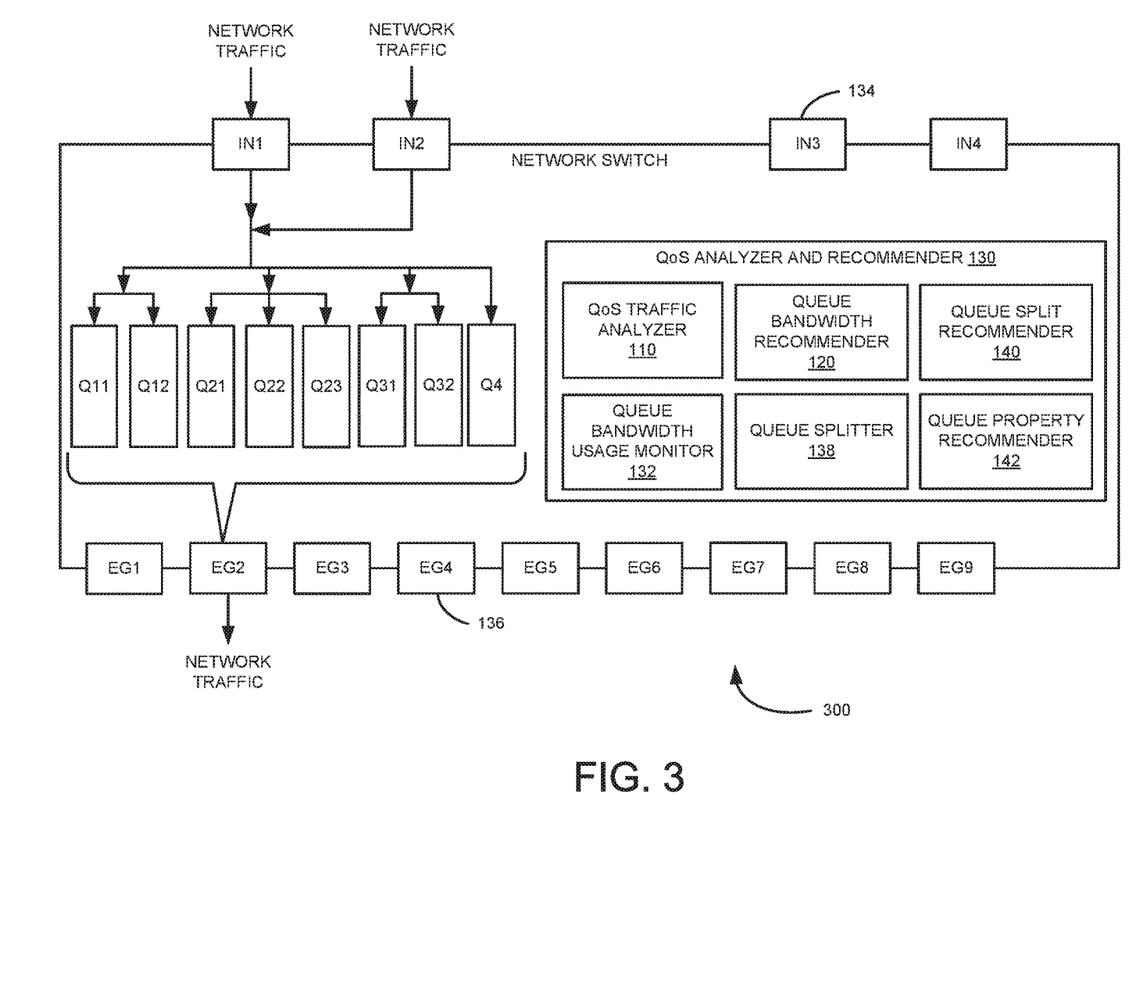
FIG. 3 illustrates yet another block diagram of an example network switch for traffic management in a datacenter using configurable QoS parameter analysis.

FIG. 3 is another example network switch 300 similar to the network switch 100 shown in FIG. 1B, but includes additional components. In the network switch 300, the additional components of the QoS analyzer and recommender 130 may include a queue splitter 138, a queue split recommender 140, and a queue property recommender 142. Further, in the network switch 300, each of the queues Q1, Q2, and Q3 may include associated split queues Q11 and Q12, Q21, Q22, and Q23, and Q31 and Q32. In an example, incoming traffic (packets) may be received by the network switch 100 or 300 and classified and placed onto preconfigured queues (for example, Q1-Q4) based on traffic class and the associated split queues Q11 and Q12, Q21, Q22 and Q23, and Q31 and Q32 based on the recommendation by the queue split recommender 140 for improved traffic management.

In an example, the network switch 100 and the network switch 300 maybe communicatively coupled to other network devices in a network and/or a datacenter to receive and output network traffic. Further in an example, the QoS analyzer and recommender 130 may reside in an external network device, such as server in a network that may be communicatively coupled to the network switch 100 or network switch 300. The network may be a wireless or wired network. The network may include, for example, a local area network (LAN), a wireless local area network (WAN), metropolitan area network (MAN), a storage area network (SAN), a campus area network (CAN) or the like. Further, the network may be a public network (for example, the Internet) or a private network (for example, an intranet).

In an instance, queue bandwidth usage monitor 132 may obtain a set of actual QoS parameters for the network switch 100 based on an incoming network traffic in the network or the datacenter. In an example, queue bandwidth usage monitor 132 may obtain a set of actual QoS parameters for each network switch in the network or the datacenter. Further in an example, the queue bandwidth usage monitor 132 may obtain the set of actual QoS parameters for the network switch 100 based on per queue for an incoming network traffic in the network or the datacenter. In an example, the incoming network traffic may enter the network switch 100 via incoming ports IN1 and IN2 as shown in FIG. 1B.

Examples of the set of QoS parameters may include QoS parameters based on per queue basis (applied across some or all ports) and/or QoS parameters based on per queue per port basis. Further example of the set of actual QoS parameters may include average demanded bandwidth, average demanded bandwidth per type-of-service (ToS) traffic type (e.g., ToS value), traffic volume per ToS traffic type, drop count per ToS traffic type, and the like. In an example, table 200 (shown in FIG. 2) illustrates obtained average demanded bandwidth on a per queue basis (i.e., Q1 to Q4).

Further in an instance, the QoS traffic analyzer 110 may analyze the obtained set of actual QoS parameters using the set of configured QoS parameters of the network switch 100. Examples of the set of configured QoS parameters may include assigned average bandwidth and/or drop count per ToS traffic type. In an example, the QoS traffic analyzer 110 may analyze the obtained set of actual QoS parameters using a set of configured QoS parameters as a reference for each network switch in the network or datacenter. Further in an example, the QoS traffic analyzer 110 may analyze the obtained set of actual QoS parameters using a set of configured QoS parameters as a reference on a per queue basis.

Figure 2:
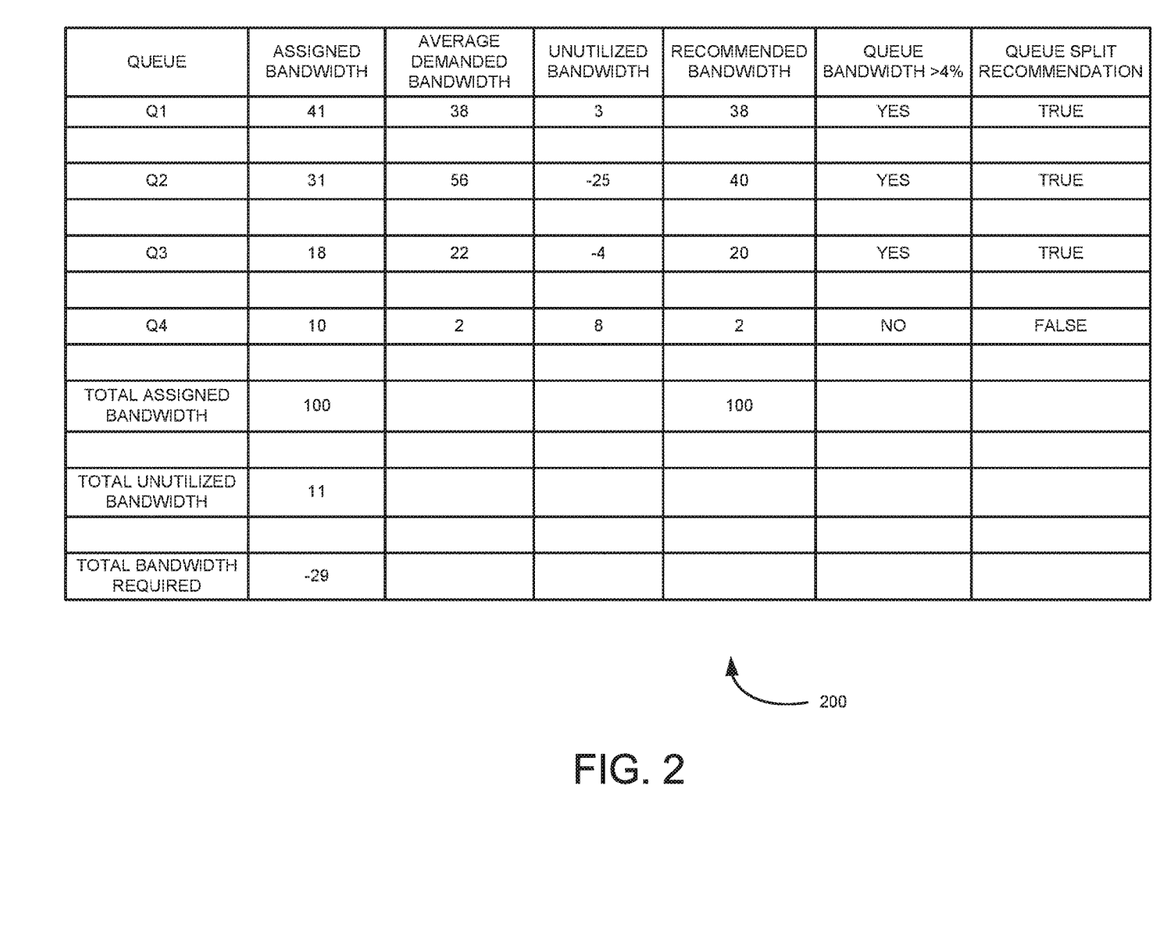
FIG. 2 is an example table illustrating the application of traffic management using the network switch, such as those shown in FIG. 1.

In an example, the QoS traffic analyzer 110, may compute unutilized bandwidth by comparing the assigned bandwidth with the actual bandwidth on a per queue basis for each network switch in the datacenter. Table 200 in FIG. 2 shows an example configured bandwidth (for example, assigned bandwidth) and the unutilized bandwidth on a per queue basis obtained by the QoS traffic analyzer 110 after comparing the obtained average demand bandwidth and the average assigned bandwidth.

Further in an instance, the queue bandwidth recommender 120 may determine a set of modified QoS parameters for the network switch 100 based on the analysis of the QoS traffic analyzer 110. In an example, the queue bandwidth recommender 120 may determine the set of modified QoS parameters for each network switch in the network and/or datacenter based on the analysis. Furthermore, in an instance, the queue bandwidth recommender 120 may determine the set of modified QoS parameters for each network switch based on the computed unutilized bandwidth on a per queue basis.

Furthermore, in an instance, the queue bandwidth recommender 120 may recommend the determined set of modified QoS parameters to configure the network switch 100 for improved traffic management. In an example, the queue bandwidth recommender 120 may recommend the determined set of modified QoS parameters for configuring each network switch in the network or datacenter for improved traffic management. Table 200 in FIG. 2 shows an example recommended bandwidth for each queue in the network switch 100. Examples of the recommended set of modified QoS parameters are bandwidth, queue bandwidth, queue split recommendation, average split queue bandwidth, queue map, ToS bandwidth ratio, queues, drop count, scheduling property, queue priority and the like. In one example, the queue bandwidth recommender 120 may apply the recommended set of modified QoS parameters to the network switch for the improved traffic management of incoming network traffic.

In an instance, the queue split recommender 140 may recommend adding more queues by splitting at least one of the queues (for example, Q1 Q2, Q3 and Q4 shown in FIG. 1B) in the network switch 100 based on the determined queue bandwidth and a threshold value. Table 200 in FIG. 2 shows an example queue split recommendation for each queue (i.e., Q1-Q4) in the network switch 100 based on the queue bandwidth and a threshold value of greater than 4% that may be based on the obtained average demand bandwidth.

Figure 4A:
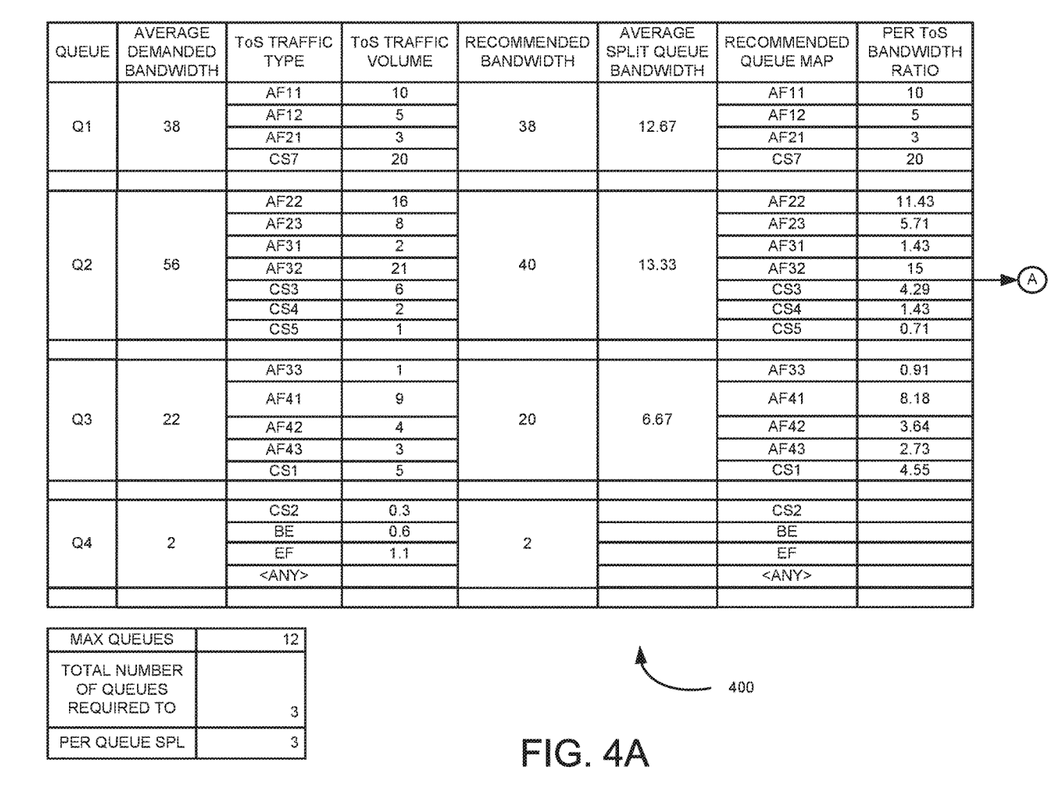
FIGS. 4A and 4B is an example table illustrating the application of traffic management using the network switch, such as those shown in FIG. 3.
Figure 4B:
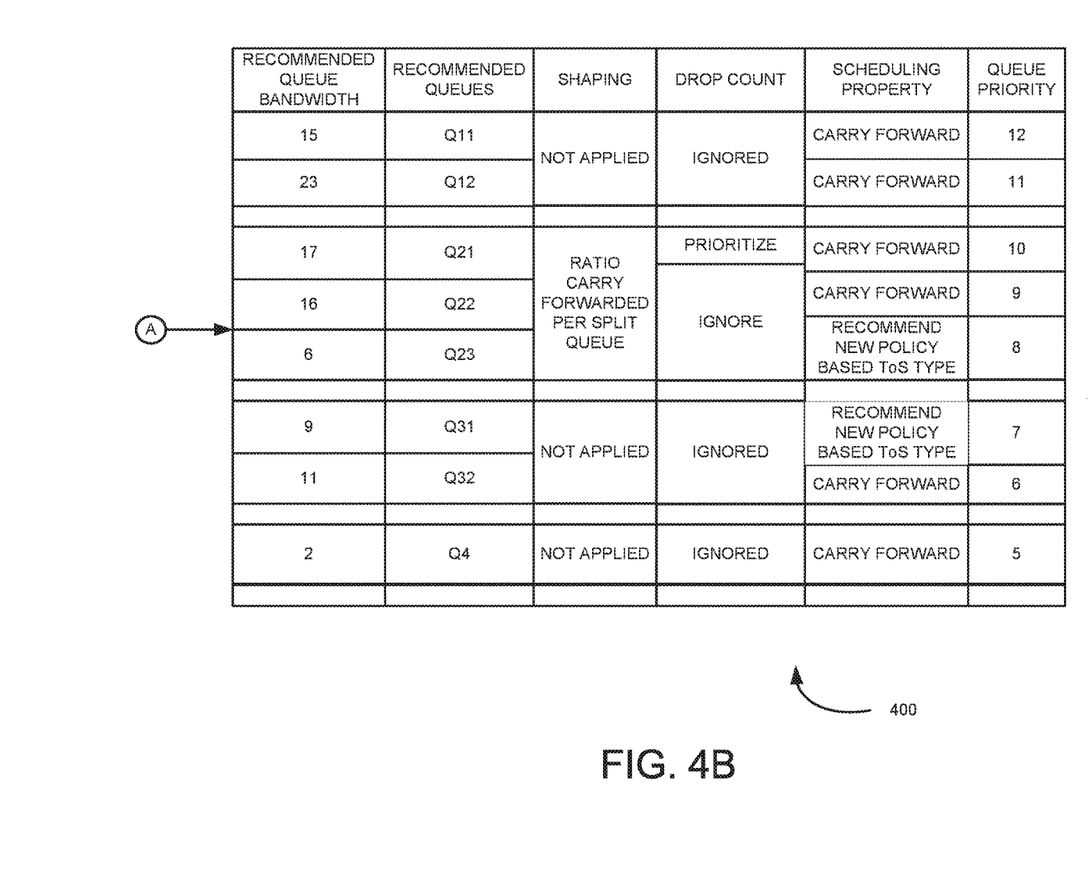

Based on the above example split recommendation by the queue splitter 138 may then split recommended queues in the network switch 100 for improved traffic management. FIGS. 4A and 4B including an example table 400 shows example split queues Q11 and Q12, Q21, Q22 and Q23, and Q31 and Q32 based on the recommendation by the queue split recommender 140 for improved traffic management. Further in the example table 400 (shown in FIGS. 4A and 4B), recommended bandwidth may be further categorized by the queue property recommender 142 based on a set of modified QoS parameters, such as bandwidth, queue bandwidth, queue split recommendation, average split queue bandwidth, queue map, ToS bandwidth ratio, queues, drop count, scheduling property, queue priority and the like. In an example, to arrive at an optimal allocation of bandwidth and classification of traffic, the QoS analyzer and recommender 130 may recommend adding more queues as described above, may further recommend changing traffic classification policies in the QoS parameters to utilize the added additional queues (i.e., split queues, for example Q11 and Q12, Q21, Q22 and Q23, and Q31 and Q32) and may furthermore recommend adjusting queue properties to proportionately share the available bandwidth for improved traffic management as shown in Table 400 included in FIGS. 4A and 4B.

In an example, the QoS traffic analyzer 110 may compute unutilized bandwidth for each queue, total unutilized bandwidth in the network switch, additional required bandwidth based on average actual demand bandwidth values in the network switch and so on before recommending a queue split to the queue split recommender 140. As shown in example Table 400 included in FIGS. 4A and 4B, for split queues, the queue splitter 138 may recommend bandwidth values per queue on a split operation, total number of queues in the network switch (for example, 100 and/or 300), traffic types being mapped to each queue, queue priority and the like.

In an example, the QoS analyzer and recommender 130 may retain queue priority value, precedence information and other such relevant QoS properties when computing a set of configurable QoS parameters, such as maximum number of queues allowed in a network switch, number of queues not requiring split, total number of queues required to split, per queue maximum split count, per split queue average bandwidth value, per ToS bandwidth ratio for each ToS traffic type, forming groups of ToS for each queue and the like.

In an example, the QoS analyzer and recommender 130 may apply queue recommendations to QoS parameters relating to the original queues by carrying over the existing drop property, shaping property, queuing policies and queue priorities to the new split queues. Scheduling policies may be recommended based on the traffic type belonging to a group assigned to a split queue and are not carried over from the original queue.

In an example, the QoS analyzer and recommender 130 may apply merging rules, such as some or all traffic flowing through a single queue for queues with classified and prioritized traffic and then may arrive at a queue count and associated properties as described above. Further in an example, the QoS analyzer and recommender 130, may split a queue to a desirable collapsible queues to achieve queue collapsing in the future, if the QoS analyzer and recommender 130 determines traffic flows may no longer warrant the use of the split queues and collapses them to a queue with the original QoS parameter configuration.

In an example, the QoS traffic analyzer 110 may detect over-subscription state for each port in the network switch 100 and analyze based on ingress port queue (UDP, TCP and so on) and generate an ordered list of ingress port/queue considering volume as a QoS parameter. The QoS traffic analyzer 110 may analyze egress rate of traffic, may determine bandwidth usage and/or drop action for each ingress port/queue in the network switch 100.

Figure 5:
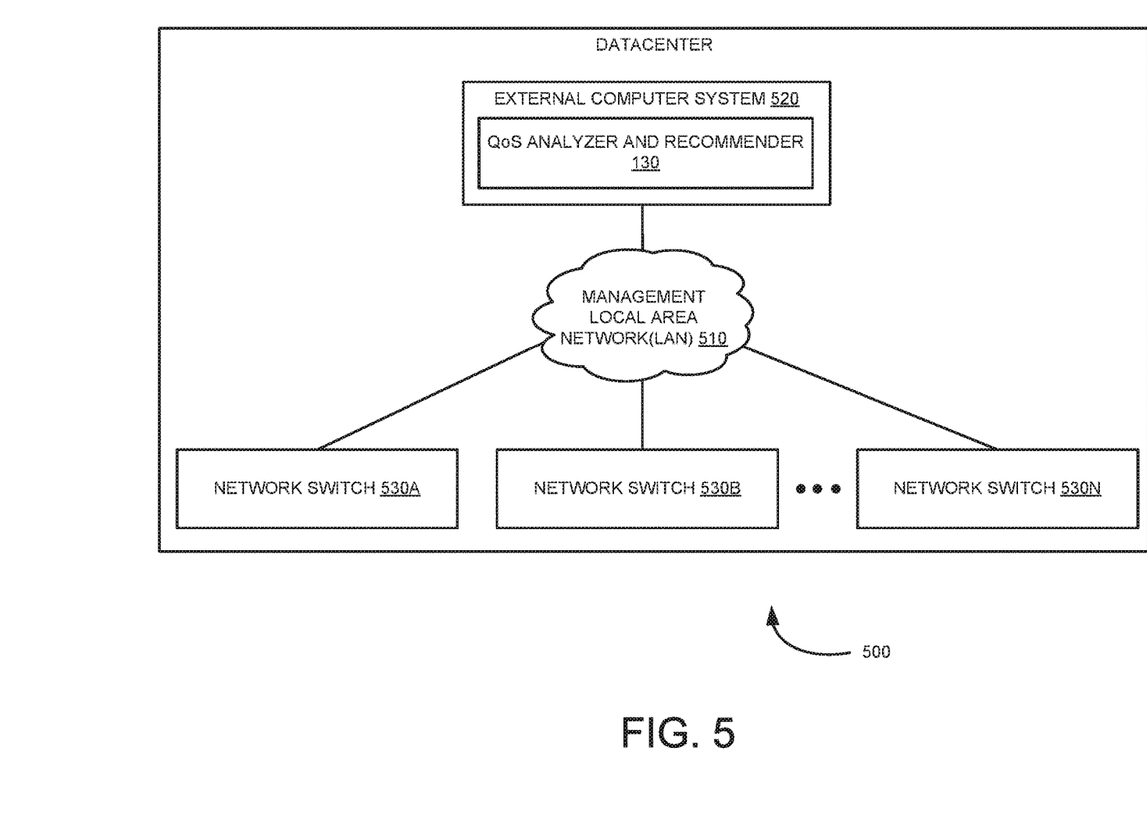
FIG. 5 illustrates a block diagram of an example datacenter including multiple network switches, such as those shown in FIGS. 1A, 1B and 3, for traffic management using configurable QoS parameter analysis.

FIG. 5 illustrates a block diagram of an example datacenter 500 including multiple network switches 530A to 530N, such as those shown in FIGS. 1A, 1B and 3, for traffic management using configurable QoS parameter analysis. As shown in FIG. 5, the datacenter 500 may include an external computer system 520 that is communicatively coupled to the multiple network switches 530A to 530N via a management local area network (LAN) 510. Further as shown in FIG. 5, the QoS analyzer and recommender 130 may reside in the external computer system 520 for traffic management in the datacenter 500.

Figure 6:
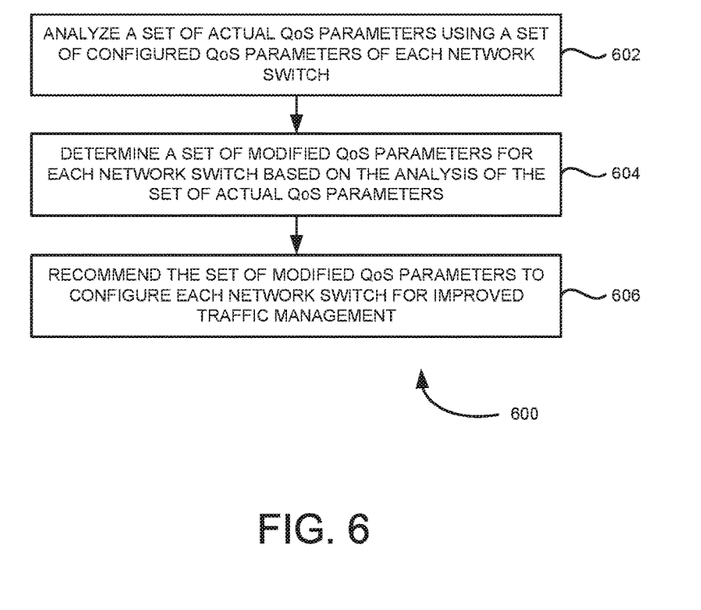
FIG. 6 is an example flowchart of a process for traffic management using QoS parameter analysis, according to one aspect of the present subject matter.

FIG. 6 is a flowchart of an example method 600 for improved network traffic management in a network switch by analyzing and configuring QoS parameters in a datacenter. The method 600, which is described below, may at least partially be executed on network switch, for example, network switch 100 and/or 300 of FIGS. 1B and 3. However, other network computing devices may be used as well. At block 602, a set of actual QoS parameters may be analyzed using a set of configured QoS parameters of each network switch in the datacenter. In one example, the set of actual QoS parameters for each network switch maybe obtained based on an incoming network traffic in the datacenter.

At block 604, the set of modified QoS parameters for each network switch may be determined based on the analysis of the set of actual QoS parameters. At block 606, the set of modified QoS parameters may be recommended to configure each network switch for improved traffic management. Further, the recommended set of modified QoS parameters may be applied for each network switch for the improved traffic management of incoming network traffic in the datacenter. In an example, the recommended set of modified QoS parameters may be dynamically/automatically applied for each network switch for the improved traffic management of incoming network traffic in the datacenter.

Figure 7:
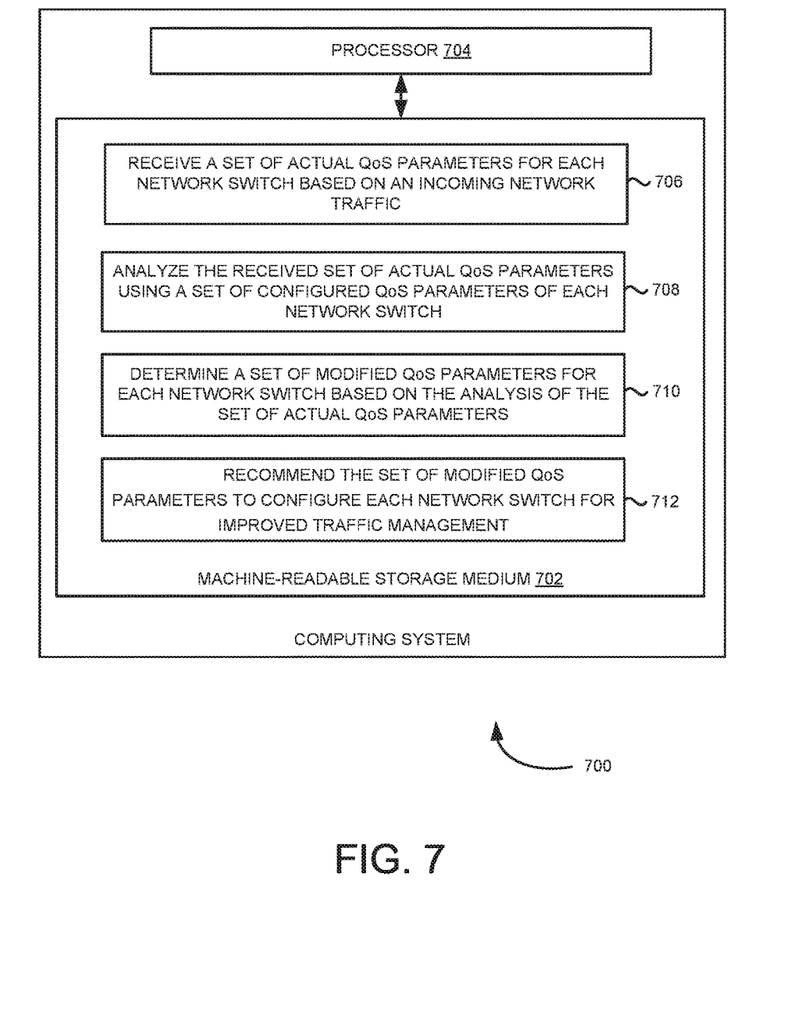
FIG. 7 is a block diagram of an example system for traffic management using QoS parameter analysis.

FIG. 7 is a block diagram of an example system 700 for improved network traffic management in a network switch by analyzing and adjusting configurable QoS parameters in a datacenter. System 700 includes a processor 704 and a machine-readable storage medium 702 communicatively coupled through a system bus. In an example, system 700 may be analogous to network switches of FIGS. 1B and 3. Processor 704 may be any type of Central Processing Unit (CPU), microprocessor, or processing logic that interprets and executes machine-readable instructions stored in machine-readable storage medium 702. Machine-readable storage medium 702 may be a random access memory (RAM) or another type of dynamic storage device that may store information and machine-readable instructions that may be executed by processor 704. For example, machine-readable storage medium 702 may be Synchronous DRAM (SDRAM), Double Data Rate (DDR), Rambus DRAM (RDRAM), Rambus RAM, etc. or a storage memory media such as a floppy disk, a hard disk, a CD-ROM, a DVD, a pen drive, and the like. In an example, machine-readable storage medium 702 may be a non-transitory machine-readable medium. Machine-readable storage medium 702 may store instructions 706, 708, 710, and 712. In an example, instructions 706, 708, 710, and 712 may be executed by processor 704 for improved traffic management in the datacenter 500 (such as those shown in FIG. 5).

For the purpose of simplicity of explanation, the example method of FIG. 6 is shown as executing serially, however it is to be understood and appreciated that the present and other examples are not limited by the illustrated order. The example systems of FIGS. 1B, 3 and 5, and method of FIG. 6 may be implemented in the form of a computer program product including computer-executable instructions, such as program code, which may be run on any suitable computing device in conjunction with a suitable operating system (for example, Microsoft Windows, Linux, UNIX, and the like). Embodiments within the scope of the present solution may also include program products comprising non-transitory computer-readable media for carrying or having computer-executable instructions or data structures stored thereon. Such computer-readable media can be any available media that can be accessed by a general purpose or special purpose computer. By way of example, such computer-readable media can comprise RAM, ROM, EPROM, EEPROM, CD-ROM, magnetic disk storage or other storage devices, or any other medium which can be used to carry or store desired program code in the form of computer-executable instructions and which can be accessed by a general purpose or special purpose computer. The computer readable instructions can also be accessed from memory and executed by a processor.

The example devices, systems, and methods described through FIGS. 1-7 may manage network traffic flowing through a network switch by analyzing and adjusting a set of configurable QoS parameters. The example devices, systems, methods described through FIGS. 1-7 may also enhance performance of the datacenters by improved network traffic management in the datacenter. The example devices, systems, methods described through FIGS. 1-7 may move network traffic to appropriate queues in a network switch and thus significantly reducing user interventions. Further, implementation of the example devices, systems, methods described through FIGS. 1-7 may be easier to adapt and enhance performance in virtual and cloud environments. Furthermore, the example devices, systems, methods described through FIGS. 1-7 may be easier to adapt in any network switch.

It may be noted that the above-described examples of the present solution are for the purpose of illustration only. Although the solution has been described in conjunction with a specific embodiment thereof, numerous modifications may be possible without materially departing from the teachings and advantages of the subject matter described herein. Other substitutions, modifications and changes may be made without departing from the spirit of the present solution. All of the features disclosed in this specification (including any accompanying claims, abstract and drawings), and/or all of the steps of any method or process so disclosed, may be combined in any combination, except combinations where at least some of such features and/or steps are mutually exclusive.

The terms "include," "have," and variations thereof, as used herein, have the same meaning as the term "comprise" or appropriate variation thereof. Furthermore, the term "based on," as used herein, means "based at least in part on." Thus, a feature that is described as based on some stimulus can be based on the stimulus or a combination of stimuli including the stimulus.

The present description has been shown and described with reference to the foregoing examples. It is understood, however, that other forms, details, and examples can be made without departing from the spirit and scope of the present subject matter that is defined in the following claims.

We claim:

1. A network switch, comprising:
a processing platform including a hardware processor to:
  analyze a set of actual QoS parameters using a set of configured QoS parameters for the network switch as a reference on a per queue basis;
  determine a set of modified QoS parameters to configure the network switch based on the analysis and recommend the set of modified QoS parameters to configure the network switch for improved traffic management, wherein the recommended set of modified QoS parameters includes queue bandwidth, queue split recommendation, average split queue bandwidth, queue map, type of service (ToS) bandwidth ratio, and drop count;
  adjust queue properties proportionate to available bandwidth and manage future queue collapsing for improved traffic management; and
  apply the recommended set of modified QoS parameters to the network switch for the improved traffic management.

2. The network switch of claim 1, comprising:
the processor to obtain the set of actual QoS parameters for the network switch based on an incoming network traffic.

3. The network switch of claim 1, further comprising the processor to:
compute unutilized bandwidth by comparing assigned bandwidth with actual bandwidth for the network switch using the analyzed set of QoS parameters.

4. The network switch of claim 3, further comprising the processor to:
determine the set of modified QoS parameters based on the computed unutilized bandwidth.

5. A method, comprising:
analyzing a set of actual QoS parameters using a set of configured QoS parameters of a network switch;
determining a set of modified QoS parameters for the network switch based on the analysis of the set of actual QoS parameters;
recommending the set of modified QoS parameters to configure the network switch for improved traffic management, wherein the recommended set of modified QoS parameters includes queue bandwidth, queue split recommendation, average split queue bandwidth, queue map, type of service (ToS) bandwidth ratio, and drop count;
adjusting queue properties proportionate to available bandwidth, and manage future queue collapsing for improved traffic management; and
applying the recommended set of modified QoS parameters to the network switch for the improved traffic management.

6. The method of claim 5, comprising:
obtaining the set of actual QoS parameters for the network switch based on an incoming network traffic.

7. The method of claim 5, wherein analyzing the obtained set of actual QoS parameters using the set of configured QoS parameters for the network switch, comprises:
computing unutilized bandwidth by comparing assigned bandwidth with actual bandwidth for the network switch.

8. The method of claim 7, wherein determining the set of modified QoS parameters for the network switch based on the analysis, comprises:
determining the set of modified QoS parameters based on the computed unutilized band width.

9. The method of claim 5, wherein the actual QoS parameters comprise an average demanded bandwidth, average demanded bandwidth per type-of-service (ToS) traffic type, traffic volume per ToS traffic type, and/or drop count per ToS traffic type.

10. The method of claim 5, wherein the configured QoS parameters comprise average assigned bandwidth and/or drop count per ToS traffic type.

11. A non-transitory machine-readable storage medium comprising instructions for improved traffic management, the instructions executable by a processor to:
receive a set of actual QoS parameters for a network switch based on an incoming network traffic;
analyze the received set of actual QoS parameters using a set of configured QoS parameters of the network switch;
determine a set of modified QoS parameters for the network switch based on the analysis of the set of actual QoS parameters; and
recommend the set of modified QoS parameters to configure the network switch for improved traffic management, wherein the recommended set of modified QoS parameters includes queue bandwidth, queue split recommendation, average split queue bandwidth, queue map, type of service (ToS) bandwidth ratio, and drop count;
cause the hardware processor to adjust queue properties proportionate to available bandwidth, and manage future queue collapsing for improved traffic management; and
apply the recommended set of modified QoS parameters to the network switch for the improved traffic management.

* * * * *